(12) United States Patent
Kreuzgruber et al.

(10) Patent No.: US 6,738,394 B1
(45) Date of Patent: May 18, 2004

(54) METHOD, APPARATUS AND PROTOCOL FOR THE UNIDIRECTIONAL AND INTERFERENCE-SAFE TRANSMISSION OF DIGITAL DATA VIA RADIO WAVES

(75) Inventors: Peter Kreuzgruber, Vienna (AT); Christian Löw, Vienna (AT); Gerhard Schultes, Unterpremstätten (AT)

(73) Assignee: Austria Mikro Systeme International Aktiengesellschaft, Unterpremstätten (AT)

( * ) Notice: Subject to any disclaimer, the term of this patent is extended or adjusted under 35 U.S.C. 154(b) by 826 days.

(21) Appl. No.: 09/640,185

(22) Filed: Aug. 17, 2000

(30) Foreign Application Priority Data

Aug. 17, 1999 (AT) ................................ 1416/99

(51) Int. Cl.[7] ............... H04J 3/06; H04J 3/00
(52) U.S. Cl. ............ 370/514; 370/503; 370/476; 370/498; 375/292
(58) Field of Search ............... 370/503, 514, 370/498, 476, 298, 300, 345, 527, 529; 375/292; 714/776

(56) References Cited

U.S. PATENT DOCUMENTS

| | | | | |
|---|---|---|---|---|
| 4,346,474 A | * | 8/1982 | Sze | 714/802 |
| 4,528,550 A | * | 7/1985 | Graves et al. | 341/56 |
| 4,860,286 A | * | 8/1989 | Forsberg et al. | 370/510 |
| 5,761,206 A | * | 6/1998 | Kackman | 370/476 |
| 5,825,824 A | * | 10/1998 | Lee et al. | 375/292 |

* cited by examiner

*Primary Examiner*—Dang Ton
*Assistant Examiner*—Robert C Scheibel
(74) *Attorney, Agent, or Firm*—Kevin E. Joyce

(57) ABSTRACT

In a method for the unidirectional and interference-safe transmission of digital data via radio waves, wherein the data which are composed of data packets each comprising a defined number of bytes and of at least one synchronization packet are transmitted from a transmitter to a receiver, it is proceeded such that each byte is transmitted in a manner comprised of flag bits as start bits, information-representing information bits and identification bits encoding the number of the respective byte and carrying the parity information and that the flag bits and the information bits are inverted in every second byte.

39 Claims, 7 Drawing Sheets

Format of a transmitted byte $B_k$

010 $b_7 b_6 b_5$ $n_2$ $b_4 b_3$ $n_1$ $b_2 b_1 b_0$ $n_0$

- 010 — Start flag
- $b_7 b_6 b_5$ $b_4 b_3$ $b_2 b_1 b_0$ — Transmitted data byte (8 bits)
- $n_2$ $n_1$ $n_0$ — Data byte number and parity

Format of an inverted transmitted byte $\overline{B_k}$

101 $\overline{b_7 b_6 b_5}$ $n_2$ $\overline{b_4 b_3}$ $n_1$ $\overline{b_2 b_1 b_0}$ $n_0$

- 101 — Start flag
- $\overline{b_7 b_6 b_5}$ $\overline{b_4 b_3}$ $\overline{b_2 b_1 b_0}$ — Transmitted data byte (8 bits), $b_0 - b_7$ inverted
- $n_2$ $n_1$ $n_0$ — Data byte number and parity

Fig. 2

METHOD, APPARATUS AND PROTOCOL FOR THE UNIDIRECTIONAL AND INTERFERENCE-SAFE TRANSMISSION OF DIGITAL DATA VIA RADIO WAVES

The invention relates to a method for the unidirectional and interference-safe transmission of digital data via radio waves, wherein the data which are composed of data packets each comprising a defined number of bytes and of at least one synchronization packet are transmitted from a transmitter to a receiver, a device for carrying out this method as well as a protocol for the unidirectional and interference-safe transmission of digital data via radio waves from a transmitter to a receiver, wherein the data are composed of data packets each comprising a defined number of bytes and of at least one synchronization packet.

The invention, in particular, refers to a protocol for the transmission of digital data, which is immune against bursty interferences, e.g. GSM signals in the 900 MHz frequency band, and which requires a minimum of hardware for the transmitter and the receiver in order to thereby guarantee interference-free transmission.

Such a protocol is used for the transmission of data packets of determined and limited lengths for signaling and controlling automatic procedures. A data packet, as a rule, contains usable information transmitted either encoded or nonencoded and optionally further information regarding data integrity. In addition, also channel coding information and synchronization information data are transmitted in order to ensure the optimum transmission via a radio channel.

Applications of such data transmission systems include remote keyless entry systems, identification systems for vehicles or persons, or machine commands operable by remote control.

In the transmission of data via radio channels, sufficient safety measures against interferences have to be taken, in particular where the frequency band used for transmission, or an adjacent frequency band, is used also by other services. This applies, for instance, to the transmission of data via the frequency band (868 MHz) released for ISM (Industrial Scientific and Medical) services, which transmission is disturbed by interferences with the signal packets of the 900 MHz GSM band.

In order to enhance the immunity against interferences both for data transmissions in which transmission errors of the individual bits occur independently of one another and for communication channels in which transmission errors occur by the splitting of clusters into bursts, the following systems are presently known:

A forward error correction system (FEC), which disregards the burst structure of the interferer. In order to ensure interference-free transmission, this system requires a great number of additional information, though. Besides, this method involves considerable decoding work.

An automatic request system (ARQ) presupposes a feedback channel, which is not available in most cases. Systems comprising a feedback channel call for a more complex hardware, requiring two transmitters/receivers and also time duplex or frequency multiplex system. When using frequency multiplex, the required band width will simultaneously increase.

The known ARQ and FEC systems offer insufficient error correction performances in the event of persistent interference bursts. Channel coding with FEC systems is feasible by one of the following methods:

Block codes offer an error detection capability just sufficient to detect random errors at individual bits. The encoder for a block code divides the information sequence into message blocks each having k information bits which are coded on n bits by the aid of block codes, block coders thus constituting systems without memory. Block codes require only simple circuits, yet are not suitable to prevent transmission errors caused by whole data packets of an interfering transmitter (burst errors).

Convolution codes differ from block codes in that the encoder includes a memory and outputs data at a given time not only as a function of the data inputs effected at that time, but also as a function of previous input blocks. A convolution coder, thus, is a system with a finite memory. Convolution codes, which were developed by Elias, Wozenkraft or Massey, are designed for the recognition of random errors. Convolution codes that are suitable for recovering burst errors, such as those developed by Berlekamp-Preparata or Iwadare-Massey, or interleaved convolution codes involve considerable decoding work. Convolution codes are primarily used for the continuous data transmission and not for the transmission of data packets. Convolution codes also call for long code sequences in order to be immune against burst errors.

Cyclic codes are suitable for both recognizing and recovering burst errors. Fire discovered a large class of cyclic codes correcting burst errors. Fire codes may be decoded by means of simple circuits. Yet, even Fire codes are designed for the continuous transmission of data, but not for the transmission of data packets.

It hence follows that the known codes either are unsuitable for recovering burst errors as is the case, for instance, with block codes or some types of convolution codes, or involve considerable decoding procedures as, e.g., for convolution codes. Cyclic codes and convolution codes, in turn, are suitable only for the continuous data transmission, but not for the transmission of individual data packets as would be of interest for applications such as, e.g., telecommanded locks.

The present invention aims to provide an interference-safe data transmission method which avoids the afore-mentioned drawbacks, which will do with a low-expense hardware both for the transmitter and for the receiver and which, moreover, keeps the power consumption of the receiver low. To solve this object, the initially described method essentially consists in that each byte is transmitted in a manner comprised of flag bits as start bits, information-representing information bits and identification bits encoding the number of the respective byte and carrying the parity information, and that the flag bits and the information bits are inverted in every second byte. The flag bits of each individual byte and the changing identification bits of the byte number prevent the formation of long sequences of 0 or 1. Because of that, the direct current (DC) components of the transmitted signal are kept as low as possible in order to thereby reduce the susceptibility to failures of the transmission. Inverting of the flag bits and of the information bits in every second byte appears like a simple encoding process, thus likewise reducing the direct current (DC) components of the signal. High DC-components in the baseband range during demodulation, i.e., in the merger lead to an offset and hence to information losses. During frequency modulation, carrier frequency shifts may occur, in particular. In order to further enhance the safety of data transmission against interferences, it is advantageously proceeded in a manner that the identification bits are arranged to be distributed within the information bits. The flag bits and the identification bits of all bytes received are known in the receiver on account of their positions within the received data flow such that, due to the distribution of the identification bits within the information bits, error signals will be recognized merely by checking the flag bits and the identification bits. The content of a byte, moreover, is provided with a parity information in one of the identification bits such that even a single error will be recognized. An even number of errors within a byte will be recognized by the additional parity information of the remaining identification bits.

Advantageously, each byte is composed of 3 bits as the start flag, 8 information bits and 3 identification bits, and each data packet is composed of 16 bytes. In this case, the DC-components of the transmitted signal are further reduced in that an unambiguous identification of 16 bytes will be enabled by the aid of the 3 identification bits, if the information bits and the flag bits of every second transmitted byte are inverted. The identification bits representing the byte number are not inverted such that with two consecutive bytes of identical parity the 3-bit identification number will, thus, be the same, yet with one of the two bytes being inverted.

In that case, it is advantageously proceeded in a manner that every second data packet is generated by inverting the preceding data packet such that, for instance, in data packets having an even packet number byte No. 2n+1 will be found inverted and in packets having an odd number byte No. 2n will be found inverted, wherein, in the instant case, inverting a data packet refers to the inversion of all of the bytes of a data packet and inverting a byte refers to the inversion of the flag bits and information bits of the byte. Different coding of one and the same information in data packets having even and odd packet numbers also leads to a reduction of the DC-component of the transmitted signal. For the flag bits, a 0-1-0 bit sequence is advantageously selected, thus enabling the same to serve as a synchronization information.

The method according to the invention, furthermore, is carried out in a manner that switch signals are generated in the receiver, which signals trigger a shift from the quiet mode of the receiver into an operating mode, whereupon the receiver is reset from the operating mode into the quiet mode after a defined time interval. The power consumption of the usually battery-powered receivers may thus be considerably lowered, whereby, for the safe identification of a signal eventually emitted by a transmitter during the short-term operating mode, the receiver after a time interval is reset into the quiet mode, which corresponds to the transmission time of 4 to 8 bits, in particular 6 bits. The receiver is thus able, during the time window in which it is in the operating mode, to recognize a signal of the associated transmitter by way of the, for instance, 6 bits received and optionally change into the permanent receive mode.

In order to prevent the receiver from remaining in a permanent quiet mode, or returning into the quiet mode, on account of the signals of an interfering transmitter, it is proceeded in a manner that the switch signal generator is based on an interval circuit whose intervals follow a defined interval pattern which is periodically repeated, and that integer multiples of the time slots of an interfering transmitter are advantageously selected as said intervals. By integer multiples in this context the result of a multiplication by 1, 2, 3, . . . , n is to be understood. The definition of the shift intervals between quiet mode and operating mode is based on the time frame of the interfering transmitter. The times of shifting into the operating mode must be chosen such that each time slot of the interfering transmitter during the total wake-up procedure will coincide with a time window in which the receiver is in the operating mode only once at most, irrespective of the relative timing of the interfering transmitter and the receiver and irrespective of the tolerance of the receiver quartz. In the event that the interfering transmitter is a GSM signal, an integer multiple of (4, 10, 14) time slots of the interfering transmitter or an integer multiple of (6, 6, 14) time slots of the interfering transmitter is selected as said interval pattern, said intervals being the number of GSM time slots located between the individual times at which the receiver is shifted into the operating mode.

In order to reach sufficient immunity against interference, the transmitter prior to the data packets transmits a synchronization packet comprised of a 0-1 bit sequence over a period of time which is larger than, or equal to, the period of time between the first and last switch signals of an interval pattern of the receiver. In doing so, the synchronization packet serves as a signal which causes the receiver to switch into the permanent receive mode. By transmitting the synchronization packet over a period of time which is larger than, or equal to, the period of time between the first and last switch signals of an interval pattern, it is safeguarded that the receiver within the synchronization packet receive period changes into the operating mode so often as to prevent the synchronization signal from coinciding with the signal of the interfering transmitter at least once during the operating mode time frame. In the event that the interfering transmitter is a GSM signal, the transmitter prior to the data packets transmits a synchronization packet composed of at least 274 bits, in particular 282 bits, and comprised of a 0-1 bit sequence. The intervals between the switching procedures, which are indicated by the number of GSM time slots, may be approximated also by the transmission time of a bit of the receiver, for the (6, 6, 14) pattern this means, for instance, (63, 63, 148), i.e., a 63 bit interval corresponds to approximately 6 GSM time slots and a 148 bit interval corresponds to approximately 14 GSM time slots. Hence, the total interval pattern is 274 bits long. Thus, the synchronization packet having a length of 282 bits is longer such that at least three shift procedures of the receiver are provided within the synchronization packet.

It may, however, also be proceeded in a manner that the transmitter between the individual data packets each transmits a synchronization packet comprised of a 0-1 bit sequence over a period of time which is unequal to an integer multiple of the time frame of an interfering transmitter, wherein the transmitter, for GSM signals constituting the interfering transmitter, between the individual data packets each transmits a 252 bit long synchronization packet comprised of a 0-1 bit sequence.

In the main, the method according to the invention, thus, enables the obtainment of an interference-safe data transmission. The data packets are repeatedly transmitted with the transmission of the synchronization information being provided either prior to the transmission of all of the data packets or prior to the transmission of each individual data packet. In order to transmit, for instance, the complete information in an environment including two interfering packets, the transmission of but three data packets one after the other will be sufficient. For the receiver, there is provided a wake-up procedure, which ensures that the receiver even in the presence of interfering packets will be waked up only if a data packet is being transmitted.

The device according to the invention for carrying out the method according to the invention essentially is characterized in that a code generator is arranged within the transmitter, which code generator encodes in bytes the data to be transmitted, wherein each byte is comprised of flag bits as start bits, information-representing information bits and identification bits encoding the number of the respective byte and carrying the parity information, and the flag bits and the information bits are found inverted in every second byte. Hence result the same advantages as pointed out above, particularly advantageous further developments being apparent from the subclaims.

Another object of the invention is a protocol for the unidirectional and interference-safe transmission of digital data via radio waves from a transmitter to a receiver, wherein the data are composed of data packets each comprising a defined number of bytes and of at least one synchronization packet. Such a protocol is to stand out for its particularly safe and error-free data transmission, wherein, in particular, it is to be immune against interference signals that are transmitted in the form of data packets. Furthermore, the DC-components of the signal transmitted by the aid of this protocol are to be kept low. This will be achieved in that each byte is comprised of flag bits as start bits, information-representing information bits and identification bits encoding the number of the respective byte and carrying the respective parity information, and that the flag bits and the information bits are found inverted in every second byte. Advantageously, the identification bits are arranged to be distributed within the information bits, wherein, furthermore, the flag bits are composed of a 0-1-0 bit sequence. The flag bits of each individual byte and the changing bits of the byte number together with the inversion of individual bytes will cause long sequences of 0 or 1 to be avoided and the DC-components of the signal to be reduced. The latter may be reduced even further if, in addition, every second data packet is generated by inverting the preceding data packet. Due to the fact that the identification bits are arranged to be distributed within the information bits, it is safeguarded that during the action of an interfering transmitter also at least one of the identification bits or of the flag bits will be changed, so that such a change will be recognized in the evaluation circuit of the receiver and the byte concerned will be identified as defective. Identification bit changes and flag bit changes may be readily recognized in the receiver, because their values and positions within the data flow are known.

In order to protect against GSM interfering signals, the protocol according to the invention is composed of 3 bits as the start flag, 8 information bits and 3 identification bits. A synchronization packet comprised of a 0-1 bit sequence, which is part of the protocol, may be arranged in front of all data packets, wherein additional synchronization packets may optionally each be arranged between the individual data packets. When using said protocol in GSM-near frequency bands, the synchronization packets comprise at least 274 bits, in particular 282 bits, and 252 bits, respectively.

In the following, the invention will be explained in more detail by way of exemplary embodiments of the protocol according to the invention illustrated in the Figures therein.

FIG. 2 shows the structure of a byte of said protocol,

Figure 1:
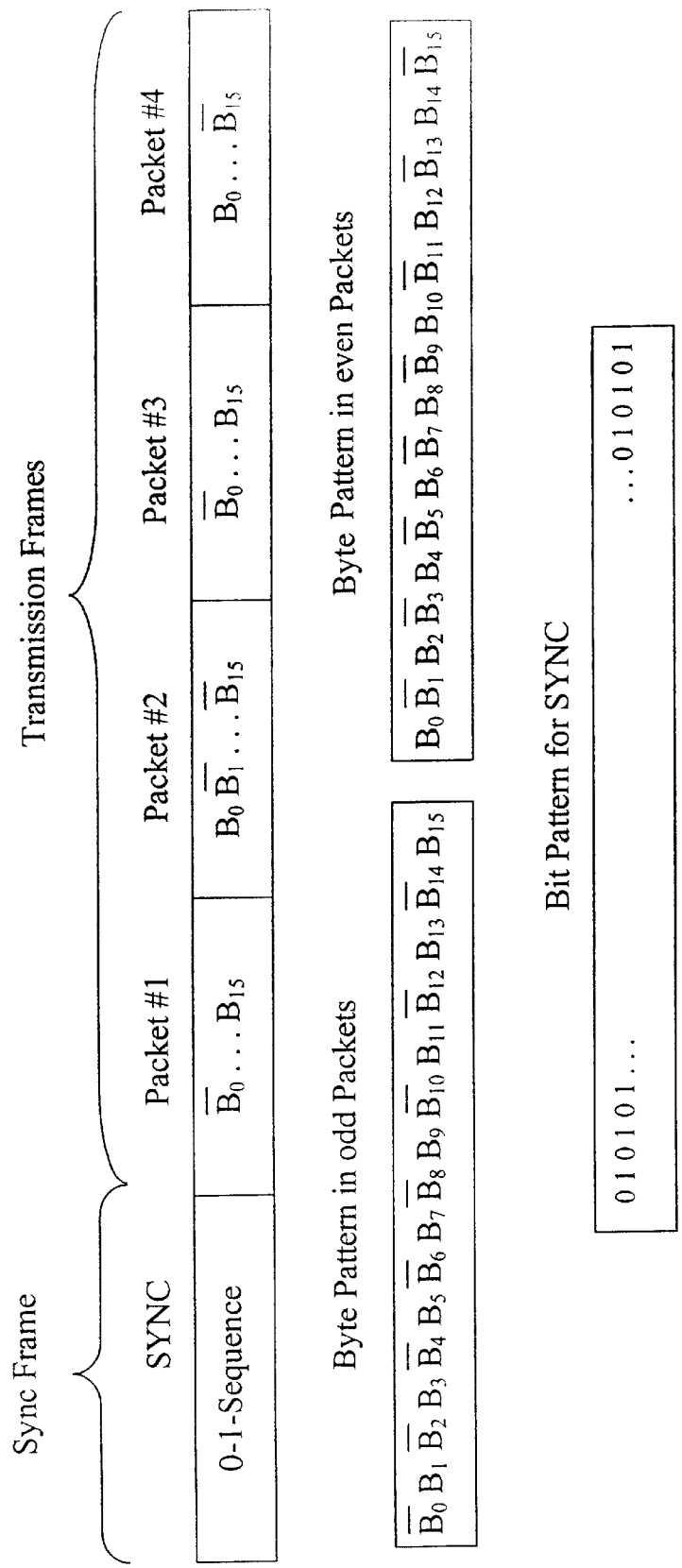
FIG. 1 depicts a first example of a protocol according to the invention.
Figure 3:
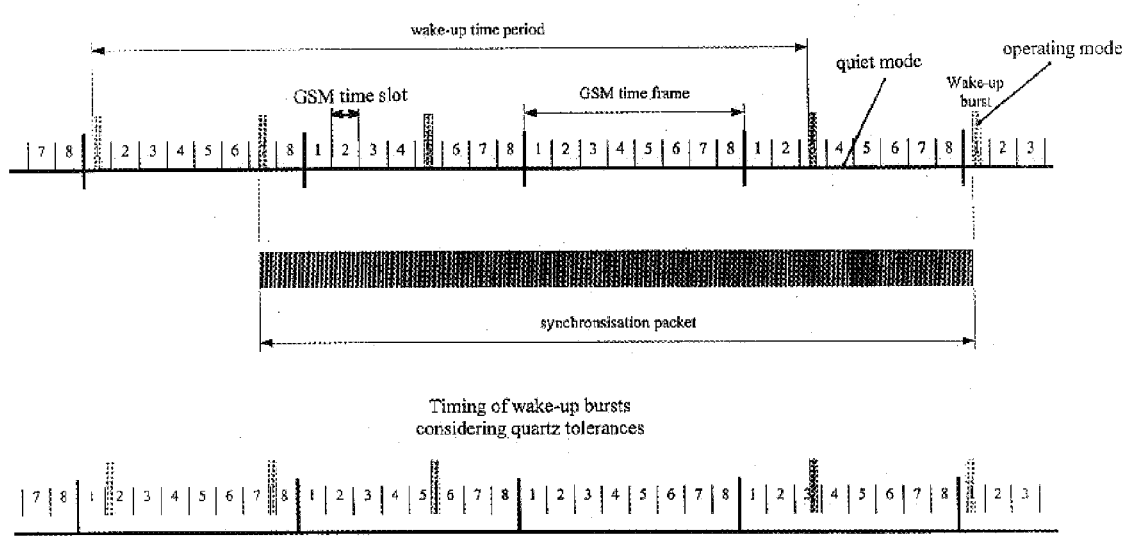
Figure 4:
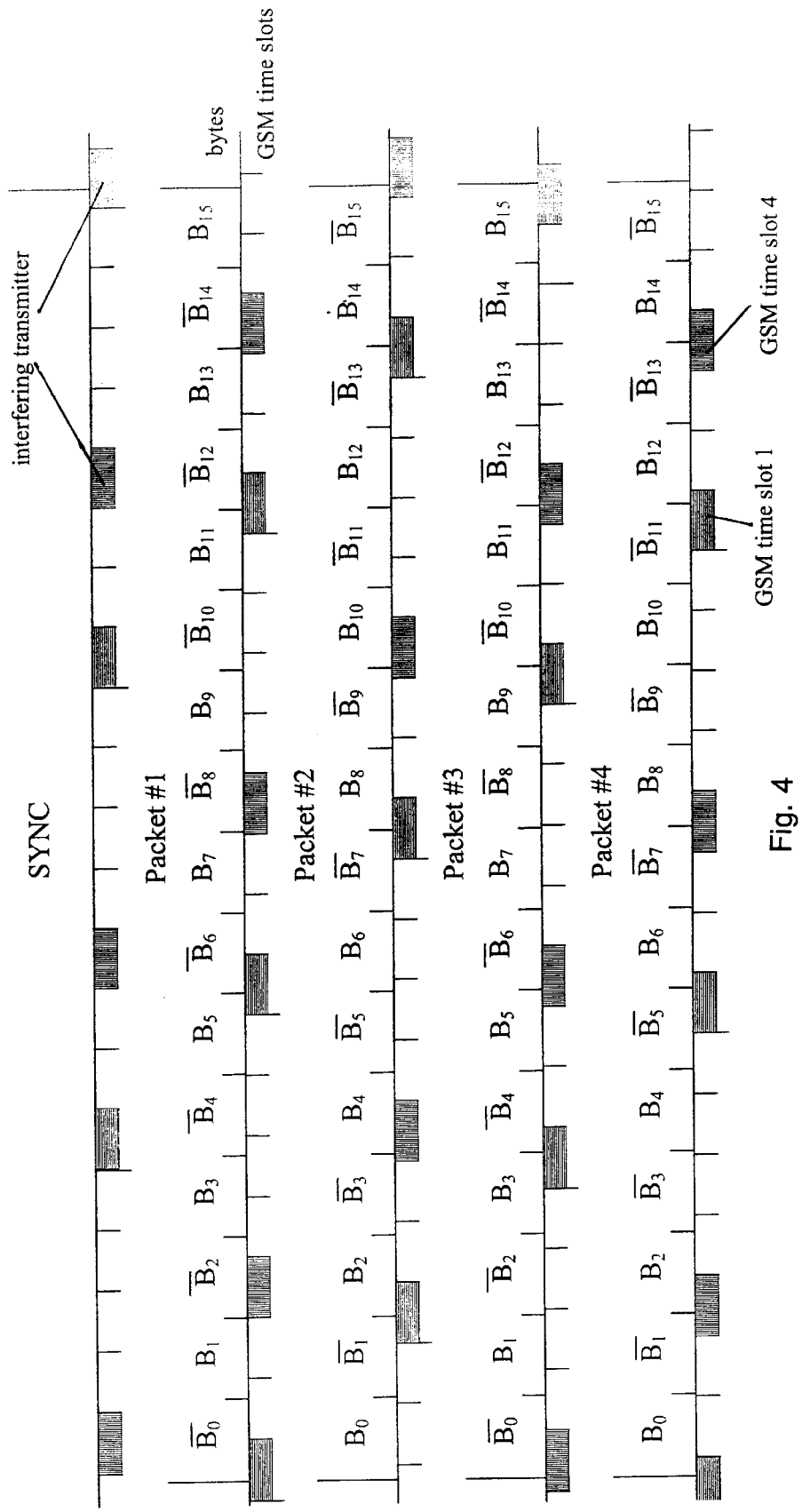
Figure 5:
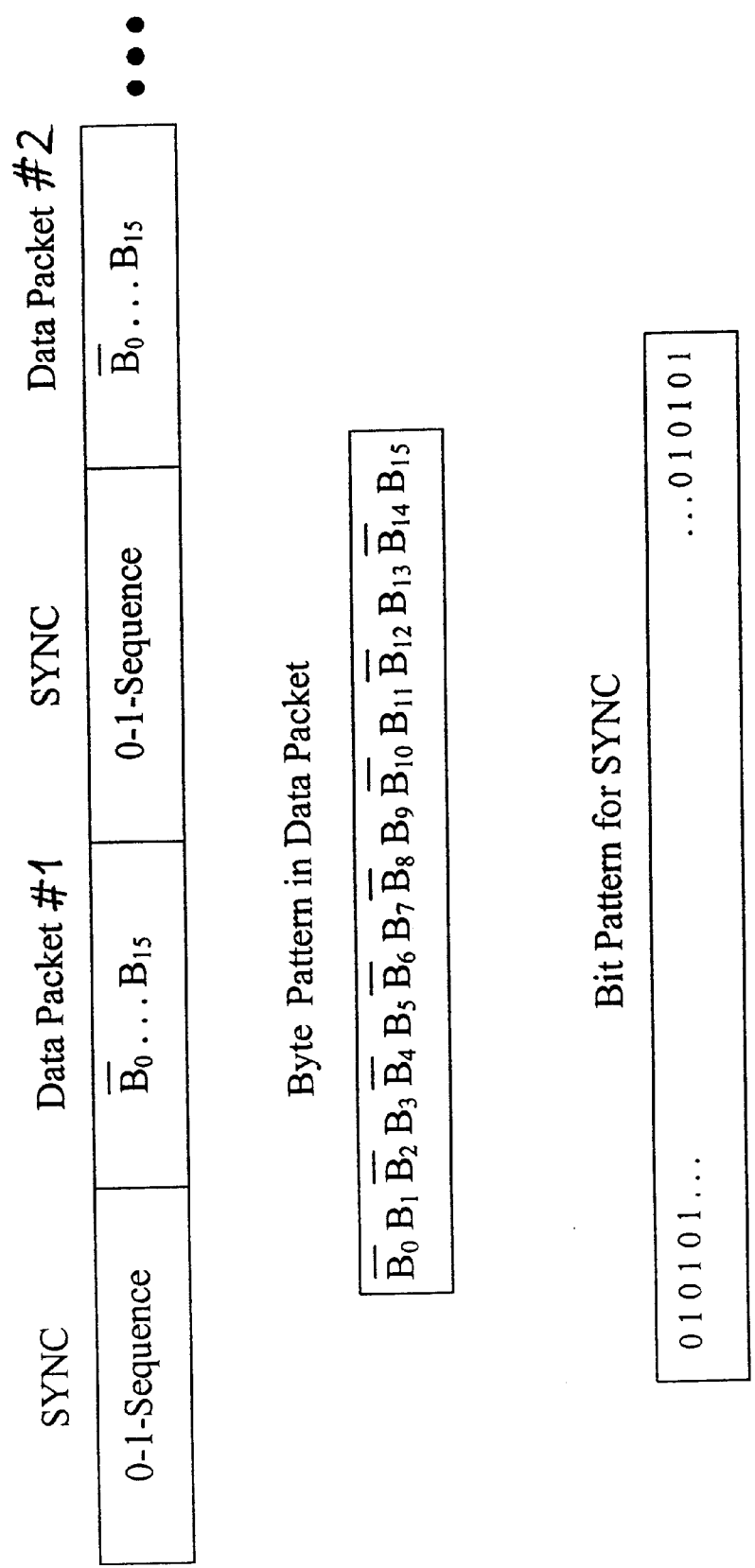
Figure 6:
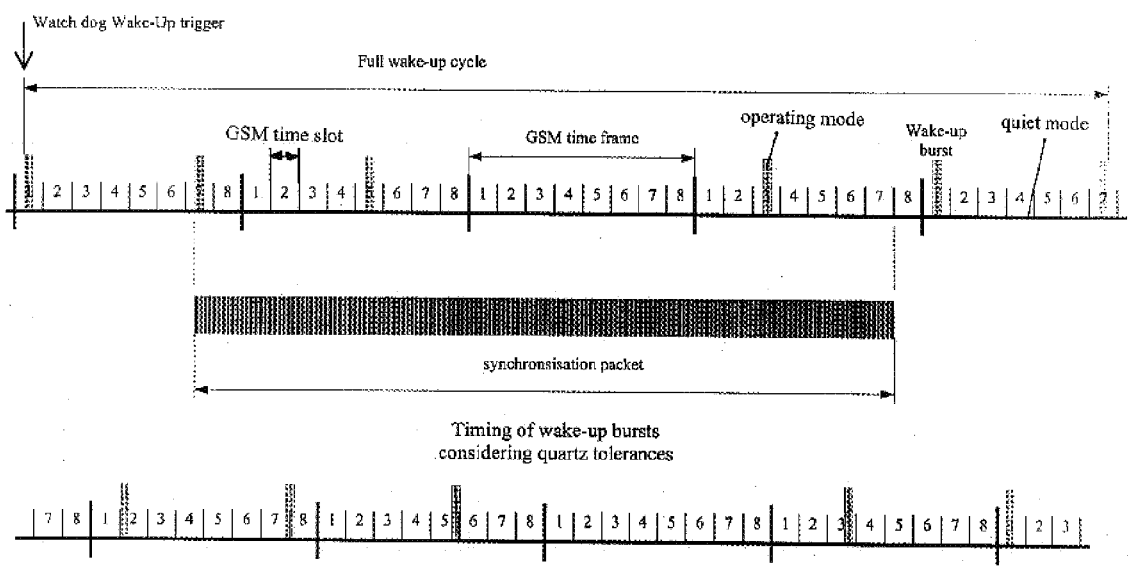
Figure 7:
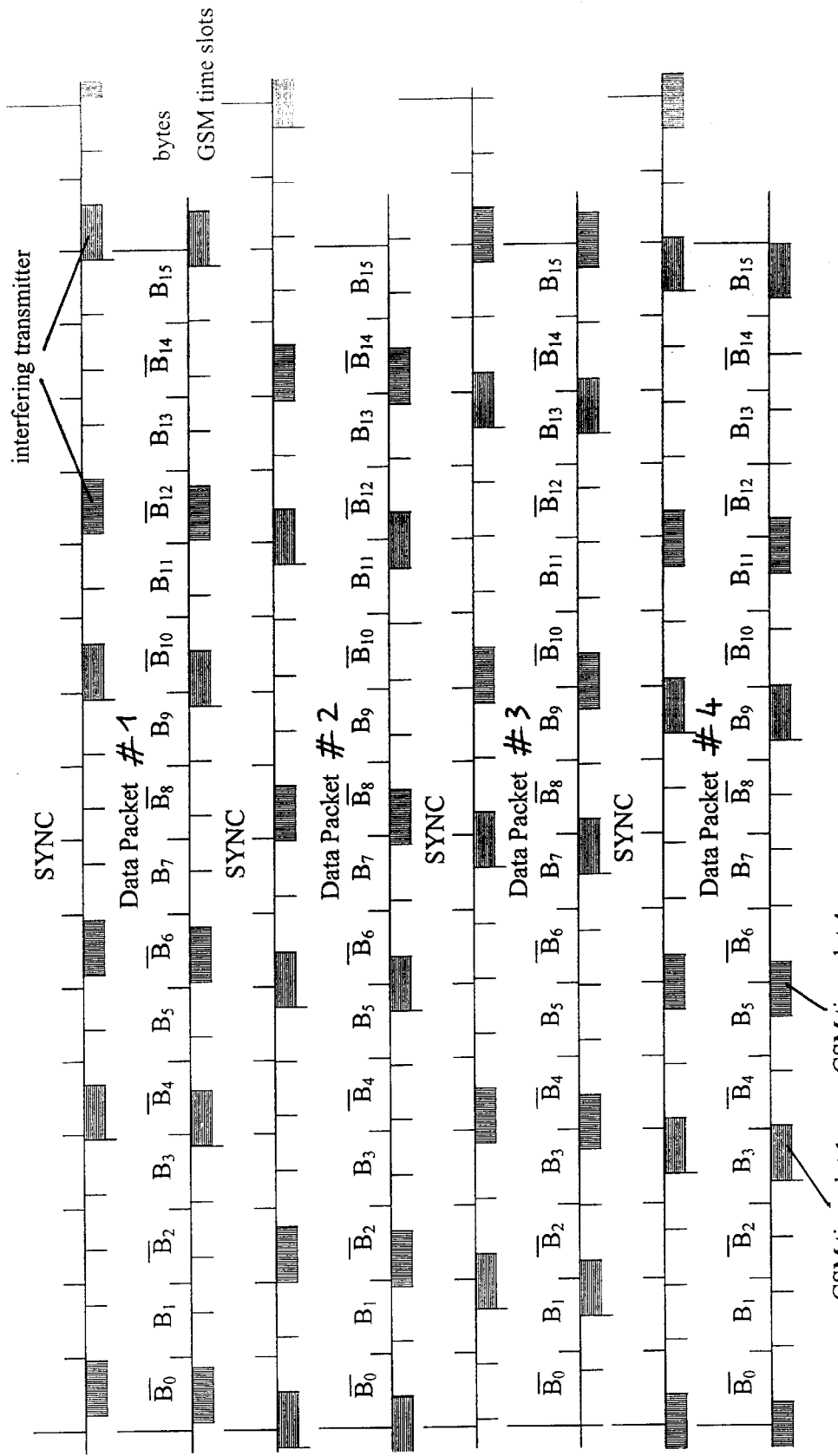

FIG. 3 elucidates the timing of the operating state changeovers of the receiver for a protocol according to FIG. 1, FIG. 4 represents the protocol according to FIG. 1 in the presence of two GSM interference signals, FIG. 5 depicts a second example of a protocol according to the invention, FIG. 6 elucidates the timing of the operating state changeovers of the receiver for a protocol according to FIG. 5, and FIG. 7 represents the protocol according to FIG. 5 in the presence of two GSM interference signals.

Two protocols according to the invention to be applied in radio-controlled access control systems are described in the following, whereby the data transmission protocol is to be immune against interferences in the form of signal packets such as, e.g., GSM. The communication system is comprised of a transmitter provided in the key and a receiver provided in the lock. The transmitter will be active only if a button is pressed by the user. If the button is pressed, the transmitter, for instance, will transmit a message corresponding to the data transmission protocol illustrated in FIG. 1. On the transmitter, too, may be provided several buttons, each triggering the transmission of a specific information using the same data transmission protocol. The receiver is in a standby status most of the time, i.e, the receiver periodically switches between an operating mode and a quiet mode. If a signal is received during a time window in which the receiver is in the operating mode, the receiver will switch into the receive mode, receiving the message transmitted by the transmitter. After this, the receiver will switch back into the quiet mode.

FIG. 1 depicts the structure of a first example of the data transmission protocol. The data transmission protocol starts with a synchronization frame comprising a 0-1 sequence having a length of 282 bits. During the transmission of this synchronization packet, both a defined wake-up procedure of the receiver and a bit synchronization will have to be ensured even if up to two GSM interference bursts are present. After the transmission of the synchronization packet, the transmission of the information proper is effected in four consecutive data packets. The packets having even, and those having odd, packet numbers differ, as illustrated in FIG. 1, inasmuch as alternating bytes will each be present inverted. If the transmission of data is not interfered with, the gross information will be received already by the first data packet transmitted. If, however, interferences occur, the same information will be transmitted repeatedly such that the receiver may correct the bytes that have become defective due to such interference. In other words, packets 2, 3 and 4 serve as forward error correction information.

A data packet is built up of 16 bytes, which constitutes the gross information that is transmitted from the transmitter to the receiver if a button has been pressed. The different buttons each emit specific pieces of information, using the same protocol, though. A byte of the information packet is a sequence of 14 bits. A complete information packet, therefore, has 16×14=224 bits.

The structure of a byte of the data packet is illustrated in FIG. 2. Each byte contains 8 information bits and six flag information bits, and the cyclic block check. The first three bits constitute a 0-1-0 synchronization flag. The remaining bits are composed of 8 information bits and 3 identification bits ($n_0$, $n_1$, $n_2$) which also carry the parity information. The byte identification number n consists of three digits, $n_0$, $n_1$, and $n_2$. The least significant bit is no. The final bit $n_2$ also carries the parity information of the transmitted byte. In order to reduce the DC-components of the transmitted signal and, at the same time, enable the unambiguous identification of 16 bytes by the aid of a 3 bit number, the information and flag bits of every second byte transmitted are inverted. The identification bits representing the byte number are not inverted. Thus, if the parity is identical in two consecutive bytes, also the 3 bit identification number of byte No. 2n and of byte No. 2n+1 will be the same, yet in data packets having even packet numbers byte No. 2n+1 will be inverted, in packets having odd packet numbers byte No. 2n will be inverted. The flag bits (0-1-0 flag) of each individual byte and the changing bits of the byte number will help to avoid long sequences of 0 or 1. Inverting of every second byte appears like a simple encoding process, different encoding of the same information in data packets having even and odd packet numbers also reducing the DC-component. In packets having odd packet numbers as 1 and 3 transmission starts with an inverted byte, in packets having even numbers as 2 and 4 the first byte is transmitted in the noninverted form.

FIG. 3 depicts the timing of the operating state changeovers of the receiver. If the receiver is in the standby mode, it regularly changes over into the operating mode at intervals of some milliseconds in order to check whether there is a signal from the transmitter. If a signal transmitted by the transmitter can be received, the receiver switches into the permanent receive mode, whereas, if no signal can be received or if the signal does not originate from the associated transmitter, the receiver will switch back into the quiet mode.

Since the frequency band (868 MHz) used for data transmission in radio-controlled access control systems, in general, has been approved also for all GSM applications (900 MHz), interferences with the same frequency band or with neighboring frequency bands will have to be expected. With the time sequence of the switching procedures of the receiver represented in FIG. 3, the recognition and reception of useful RX signals is feasible even in the presence of up to two GSM interference bursts. The shift times of the receiver are selected such that at least three shift cycles occur in the time in which the synchronization packet is transmitted. Furthermore, the times of shifting into the operating mode must be selected such that every time slot of the GSM interfering transmitter during the whole wake-up procedure coincides once at most, with a time window in which the receiver is in the operating mode. From FIG. 3 it is apparent that this condition is met by the choice of an interval pattern (6, 6, 14). The sum of the intervals of an interval pattern defines the entire wake-up phase, and it is to be seen that the operating mode times (wake-up bursts) during the entire wake-up phase coincide with time slots 1, 7 and 5. The synchronization packet extends over at least three such times so that, if two interference signals are present, for instance in time slots 1 and 7, the synchronization signal can be received without interference at least once within the wake-up phase, for instance in time slot 5. From FIG. 3 it is apparent that this is the case even if inaccuracies of the transmitter quartz are taken into consideration.

After the successful wake-up phase, in which the receiver switches into the permanent receive mode, the transmission and evaluation of the data packets take place. Data evaluation starts with frame synchronization. The frame synchronization information consists of the 0-1-0 and 1-0-1 head information (flag bits) and of the sequence of the identification bits constituting the byte number. In a first step, the parity information of the identification bit $n_2$ is omitted. Only the synchronization information of the received byte will be considered, i.e., (0-1-0, $n_2$, $n_1$, $n_0$) and (1-0-1, $n_2$, $n_1$, $n_0$), the first three bits (flag bits) representing the synchronization information. In data packets having even packet numbers (0-1-0, $n_2$, $n_1$, $n_0$) and (1-0-1, $n_2$, $n_1$, $n_0$) occur with the same n in succession, and in packets having odd packet numbers (1-0-1, $n_2$, $n_1$, $n_0$) and (0-1-0, $n_2$, $n_1$, $n_0$) occur with the same n in succession. In order to guarantee a frame synchronization for any desired byte content and in the event of an interference, the frame synchronization procedure should contain a sequence of 16 consecutive bytes, i.e., a complete data packet No. 1. The synchronization information and the packet numbers of all bytes received are known in the receiver on grounds of their positions within the received data flow. The identification bits, moreover, are distributed within the information bits such that error signals may be recognized only by checking the synchronization information and identification bits. The content of a byte is provided with a parity information in identification bit $n_2$ so as to enable the recognition even of a single error. An even number of errors within a byte can be recognized by the additional parity bits on $n_1$, and $n_0$.

Upon completion of the frame synchronization procedure, the received bytes get into a shift register and the defective bytes are flagged. If a byte has been marked as defective, the same byte will be recognized in the following data packet etc. If there is a complete set of received bytes without error marking, the data may be read out. If a defective byte still remains after the last received data packet, the receiver will signalize a transmission error.

In FIG. 4, data transmission interference with GSM interfering transmitters is shown. The GSM interfering transmitters in the instant case use time slots 1 and 4. It is apparent that even in the presence of two GSM interfering transmitters after the transmission of three data packets each byte is found undefected.

A second example of the protocol according to the invention is depicted in FIG. 5. It comprises one synchronization packet each in front of each data packet. This protocol is provided for another receiver structure, which, unlike the previously described wake-up procedure, does not interrogate the air interface cyclically. This protocol is suitable for a receiver setting higher demands on power consumption. The data transmission protocol starts with a synchronization packet consisting of a 0-1 sequence of 252 bits. After the transmission of the synchronization packet, the transmission of the information proper and, after this, the transmission of the following synchronization packet will start. If the transmission is not disturbed by any interferences, all pieces of information will be completely transmitted by one data packet only. If there is an interference, the repeated transmission of the same information will enable the correction of defectively received bytes.

The DC-components of the transmitted signal is reduced also in this configuration of the transmission protocol by inverting the synchronization head information (flag bits) and the information bits of every second byte. The inverted flag bits of every second byte, at the same time, allow for the unambiguous identification of 16 bytes by the aid of a number consisting of three identification bits. The identification bits themselves are not inverted. Thus, if the parity in two consecutive bytes is equal, also the three identification bits of byte No. 2n and byte No. 2n+1 will be identical. Transmission starts with an inverted byte. The flag bits of each byte and the changing identification bits result in long sequences of 0 or 1 being excluded. Inverting of every second byte appears like a simple encoding procedure, simultaneously reducing the DC-components.

FIG. 6 shows the wake-up procedure for the protocol represented in FIG. 5. That protocol is designed for a receiver with which it is feasible to trigger the wake-up procedure externally. There, it is conceivable that the receiver changes into the operating mode also during a data packet and no 0-1 sequence is available to synchronization. The reason for this is that the wake-up procedure is longer than in the first example of the transmission protocol. A longer wake-up procedure allows for the error-free recognition and the error-free reception of useful RX signals even in the presence of up to two GSM interfering transmitters. This also applies if the receiver switches into the operating mode during a data packet.

In order to ensure sufficient immunity against interferences, at least six switching procedures of the receiver must occur during the synchronization packet. At the same time, each of the GSM time slots is to coincide once at most, with a time in which the receiver is in the operating mode. From FIG. 6 it is apparent that this condition is met by choosing an interval pattern (6, 6, 14). It is to be seen that the operating mode times during the entire wake-up phase coincide with time slots 1, 7, 5 and 3. The synchronization packet extends over at least three such times so that in the presence of two interference signals, for instance in time slots 7 and 5, the synchronization signal will be received undisturbed at least once within the wake-up phase, for instance in time slot 3. From FIG. 6 it is apparent that this applies even if inaccuracies of the transmitter quartz are taken into consideration.

After the successful wake-up phase, in which the receiver switches into the permanent receive mode, the transmission and evaluation of the data packets take place. Data evaluation in this embodiment of the data protocol is much easier, the data packets each being identically structured. It is, thus, not necessary to know whether a data packet bears an even or odd packet number. The synchronization information of all bytes received is known in the receiver on grounds of their positions within the received data flow. The identification bits constituting the byte numbers, moreover, are distributed within the information bits such that bytes that have become defective will be recognized merely by checking the synchronization information. The content of a byte is provided with a parity information on identification bit $n_2$ so as to enable the recognition even of a single error. An even number of errors within a byte can be recognized only if also bits $n_1$, and no contain parity information, which, however, involves increased expenses in terms of signal processing.

FIG. 7 illustrates interferences between the transmitted data packets and the GSM interfering transmitters, whereby it is apparent that even in the presence of two GSM interfering transmitters, namely in time slots 1 and 4, each byte is present undistorted at least once after the transmission of three data packets.

What is claimed is:

1. A method for unidirectional and interference-safe transmission of digital data by radio waves, comprising:
   transmitting the data from a transmitter to a receiver in the form of at least one synchronization packet and a plurality of data packets, each data packet having a defined number of bytes; and
   transmitting each byte of a data packet in the form of flag bits as start bits, information-representing information bits, and identification bits for encoding the number of the byte and carrying parity information, the flag bits and the information bits being inverted in every second byte.

2. A method according to claim 1, wherein the identification bits are arranged to be distributed within the information bits.

3. A method according to claim 1, wherein each byte is composed of 3 start bits as a start flag, 8 information bits and 3 identification bits, and wherein each data packet is composed of 16 bytes.

4. A method according to claim 1, wherein every second data packet is generated by inverting a preceding data packet.

5. A method according to claim 1, wherein a 0-1-0 bit sequence is selected for the flag bits.

6. A method according to 1, further comprising:
   generating switch signals in the receiver to trigger a shift from a quiet mode of the receiver to an operating mode, the receiver being reset from the operating mode to the quiet mode after a defined time interval.

7. A method according to claim 6, wherein said time interval corresponds to a transmission time for 4 to 8 bits.

8. A method according to claim 6 wherein the generation of switch signals is based on an interval circuit having a defined interval pattern which is periodically repeated.

9. A method according to claim 8, wherein an integer multiple of time slots of an interfering transmitter is selected as said interval.

10. A method according to claim 9, wherein an integer multiple of (4, 10, 14) time slots of the interfering transmitter is selected as said interval pattern.

11. A method according to claim 9, wherein an integer multiple of (6, 6, 14) time slots of the interfering transmitter is selected as said interval pattern.

12. A method according to claim 8, wherein prior to the data packets the transmitter transmits a synchronization packet comprised of a 0-1 bit sequence over a period of time which is larger than, or equal to, the period of time between first and last switch signals of the interval pattern of the receiver.

13. A method according to claim 8, wherein prior to the data packets the transmitter transmits a synchronization packet comprising at least 274 bits having a 0-1 bit sequence.

14. A method according to claim 1, wherein the transmitter between individual data packets transmits a synchronization packet comprised of a 0-1 bit sequence over a period of time which is unequal to an integer multiple of a time frame of an interfering transmitter.

15. A method according to claim 1, wherein the transmitter between individual data packets transmits a 252 bit long synchronization packet comprised of a 0-1 bit sequence.

16. Apparatus for unidirectional and interference-safe transmission of digital data by radio waves, comprising:
   a transmitter for transmitting the data to a receiver in the form of at least one synchronization packet and a plurality of data packets, each data packet having a defined number of bytes, said transmitter including a code generator which encodes in bytes the data packets to be transmitted, wherein each byte is comprised of flag bits as start bits, information-representing information bits and identification bits for encoding the number of the byte and carrying parity information, the flag bits and the information bits being inverted in every second byte.

17. Apparatus according to claim 16, wherein the code generator includes an intermediate memory for the identification bits so as to enable the identification bits to be distributed within the information bits.

18. Apparatus according to claim 16, wherein the code generator encodes each byte to have 3 flag bits as a start flag, 8 information bits and 3 identification bits, and wherein each data packet is composed of 16 bytes.

19. Apparatus according to claim 16, wherein the code generator generates every second data packet by inverting the preceding data packet.

20. Apparatus according to claim 16, wherein the code generator encodes the start bits in a 0-1-0 bit sequence.

21. Apparatus according to claim 16, wherein the receiver includes a switch signal generator which triggers a shift from a quiet mode of the receiver to an operating mode, the receiver being reset from the operating mode to the quiet mode after a defined time interval.

22. Apparatus according to claim 20, wherein the receiver includes a time switch which, after a time interval corresponding to the transmission time of 4 to 8 bits, resets the receiver into the quiet mode.

23. Apparatus according to claim 1, wherein the switch signal generator comprises an interval switch which operates in a defined interval pattern which is periodically repeated.

24. Apparatus according to claim 23, wherein the signal generator includes a memory in which time intervals are stored as integer multiples of time slots of an interfering transmitter.

25. Apparatus according to claim 23, wherein the switch signal generator includes a memory in which the interval pattern is stored as an integer multiple of (4, 10, 14) time slots of an interfering transmitter.

26. Apparatus according to claim 23, wherein the switch signal generator includes a memory in which the interval pattern is stored as an integer multiple of (6, 6, 14) time slots of an interfering transmitter.

27. Apparatus according to claim 23, wherein the transmitter includes a signal generator which generates the synchronization packet in a 0-1 bit sequence which is transmitted prior to the data packets and which contains at least as many bits as corresponds to a period of time between first and last switch signals of an interval pattern of the receiver.

28. Apparatus according to claim 23, wherein the transmitter includes a signal generator which generates the synchronization packet in a 0-1 bit sequence which is transmitted prior to the data packets and which has a length of at least 274 bits.

29. Apparatus according to claim 16, wherein the transmitter includes a signal generator for generating a synchronization packet having a 0-1 bit sequence which is transmitted between individual data packets and having a signal length which is unequal to an integer multiple of a time frame of an interfering transmitter.

30. Apparatus according to claim 16, wherein the transmitter includes a signal generator which generates a synchronization packet which is transmitted between individual data packets, the synchronization packet having a 0-1 bit sequence and a length of 252 bits.

31. A protocol for unidirectional and interference-safe transmission of digital data by radio waves from a transmitter to a receiver, wherein the data are composed of data packets each comprising a defined number of bytes and of at least one synchronization packet, wherein each byte of a data packet includes flag bits as start bits, information-representing information bits and identification bits for encoding the number of the respective byte and carrying respective parity information, the flag bits and the information bits being inverted in every second byte.

32. A protocol according to claim 31, wherein the identification bits are distributed within the information bits.

33. A protocol according to claim 31, wherein each byte is composed of 3 flag bits as a start flag, 8 information bits and 3 identification bits, and wherein each data packet is composed of 16 bytes.

34. A protocol according to claim 31, wherein every second data packet is generated by inverting a preceding data packet.

35. A protocol according to claim 31, wherein the start bits have a 0-1-0 bit sequence.

36. A protocol according to claim 31, wherein a synchronization packet having a 0-1 bit sequence is arranged in front of the data packets.

37. A protocol according to claim 31, wherein a synchronization packet arranged in front of the data packets includes at least 274 bits.

38. A protocol according to claim 31, wherein a synchronization packet having a 0-1 bit sequence is arranged between individual data packets.

39. A protocol according to claim 31, wherein synchronization packets having 252 bits are arranged between the data packets.

* * * * *